(12) United States Patent
Terrell et al.

(10) Patent No.: US 9,814,350 B2
(45) Date of Patent: Nov. 14, 2017

(54) SLOW COOKER ACCESSORY

(71) Applicants: Erica Terrell, Charlottesville, VA (US); Micah Terrell, Charlottesville, VA (US)

(72) Inventors: Erica Terrell, Charlottesville, VA (US); Micah Terrell, Charlottesville, VA (US)

(73) Assignee: ME Accesories, LLC, Charlottesville, VA (US)

( * ) Notice: Subject to any disclaimer, the term of this patent is extended or adjusted under 35 U.S.C. 154(b) by 15 days.

(21) Appl. No.: 14/800,867

(22) Filed: Jul. 16, 2015

(65) Prior Publication Data

US 2016/0015203 A1    Jan. 21, 2016

Related U.S. Application Data

(60) Provisional application No. 62/025,651, filed on Jul. 17, 2014.

(51) Int. Cl.
*A47J 27/00*    (2006.01)
*A47J 27/04*    (2006.01)
*A47J 27/08*    (2006.01)
*A47J 36/20*    (2006.01)

(52) U.S. Cl.
CPC ..................... *A47J 36/20* (2013.01)

(58) Field of Classification Search
CPC    A47J 27/00; A47J 27/04; A47J 27/082; A47J 36/20; A47J 41/0077
USPC .................. 99/410–418, 422–425, 448–450; 219/725, 727, 428–442, 452.12
See application file for complete search history.

(56) References Cited

U.S. PATENT DOCUMENTS

| | | | | |
|---|---|---|---|---|
| 4,646,628 A | * | 3/1987 | Lederman | A47J 27/122 220/23.4 |
| 5,649,476 A | * | 7/1997 | Montagnino | A47J 27/04 122/31.1 |
| 5,673,611 A | | 10/1997 | Tieman | |
| 6,125,738 A | | 10/2000 | Poister | |
| 6,313,446 B1 | | 11/2001 | Jones | |
| 6,422,233 B1 | * | 7/2002 | Bhagat | A47J 27/022 126/375.1 |
| 6,443,053 B1 | * | 9/2002 | Rossi | A47J 27/05 126/20 |
| 7,112,764 B2 | | 9/2006 | Garcia | |
| 7,485,831 B2 | | 2/2009 | Tynes et al. | |
| 7,943,888 B2 | * | 5/2011 | Barnes | A47J 27/004 219/432 |
| 8,025,007 B1 | * | 9/2011 | Boyer | A47J 37/1242 99/339 |
| 2009/0087534 A1 | * | 4/2009 | McLemore | A47J 37/1209 426/523 |
| 2009/0095169 A1 | * | 4/2009 | York | A47J 27/004 99/448 |

(Continued)

*Primary Examiner* — Michael Laflame, Jr.
(74) *Attorney, Agent, or Firm* — Kimberly O. Snead

(57) ABSTRACT

A slow cooker accessory for separating food into desired configurations for the duration of the cooking time and for easily removing food from cooking fluids, juices, and fats at any time during the cooking process. The slow cooker accessory includes a receptacle that fits within existing slow cooker vessels, wherein the receptacle has a walled body with a plurality of openings, an open end with a rim, and handles that engage the slow cooker vessel.

15 Claims, 5 Drawing Sheets

(56) References Cited

U.S. PATENT DOCUMENTS

| | | | |
|---|---|---|---|
| 2009/0107345 A1* | 4/2009 | Yeung | A47J 27/04 99/413 |
| 2011/0000380 A1* | 1/2011 | Jamison | A47J 27/05 99/417 |
| 2011/0083563 A1* | 4/2011 | Branson | A47J 27/04 99/410 |
| 2012/0222562 A1* | 9/2012 | Mohammed | A47J 27/04 99/341 |
| 2012/0291636 A1* | 11/2012 | von Seidel | A47J 36/20 99/450 |
| 2013/0098892 A1* | 4/2013 | Zhang | A47J 27/04 219/401 |
| 2013/0101720 A1* | 4/2013 | Allaire | A23L 1/0151 426/510 |
| 2013/0125765 A1* | 5/2013 | Difante | A47J 36/20 99/403 |
| 2015/0201788 A1* | 7/2015 | Douma | A47J 27/04 99/330 |
| 2016/0192804 A1* | 7/2016 | Mesmer | A47J 27/56 99/410 |
| 2016/0255984 A1* | 9/2016 | Affatato | A47J 27/04 |
| 2016/0316964 A1* | 11/2016 | Gerard | A47J 36/38 |

* cited by examiner

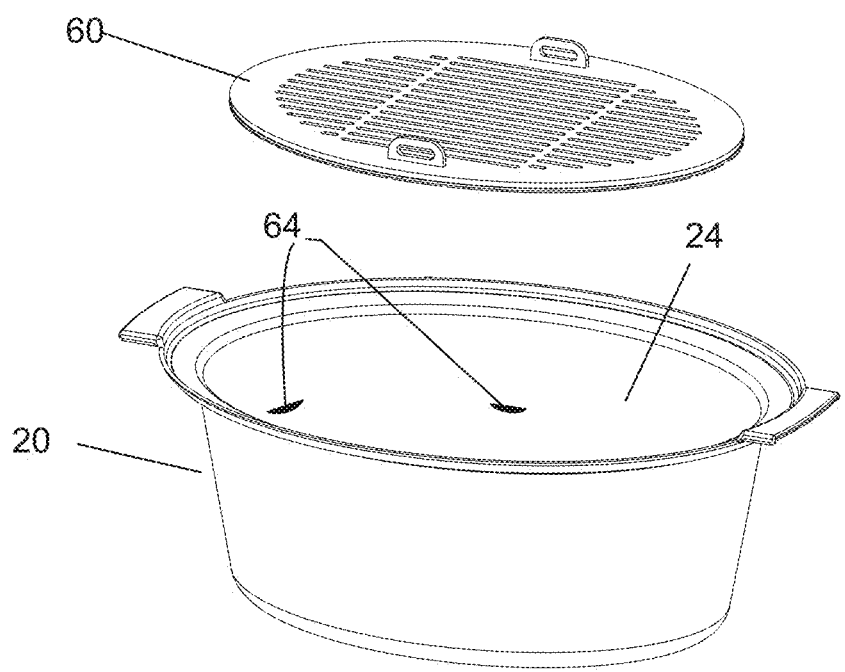

SLOW COOKER ACCESSORY

FIELD OF THE INVENTION

The invention discloses a cooking accessory for use in a slow cooker that allows food to be separated from other food within the slow cooking vessel and allows food to be separated from cooking liquid and/or fat upon removal of the cooking accessory from the slow cooking vessel.

BACKGROUND OF THE INVENTION

Slow cookers have been helping busy persons create home-cooked meals for decades. The appeal of the slow cooker is the ability to throw multiple ingredients into the cooking vessel and come back hours later to a fully cooked meal. However, while the cooking of multiple ingredients at the same time is desired, the serving of all of the ingredients together is not always desired. Separating foods and liquids cooked together in a slow cooker is currently a slow and messy process.

BRIEF DESCRIPTION OF THE DRAWINGS

The objects, features, advantages and aspects of the present invention can be better understood with reference to the following detailed description of the preferred embodiments when read in conjunction with the appended drawing figures.

FIG. 4 is a perspective view of the plate-supporting walled body receptacle embodiment.

SUMMARY OF INVENTION

Figure 1:
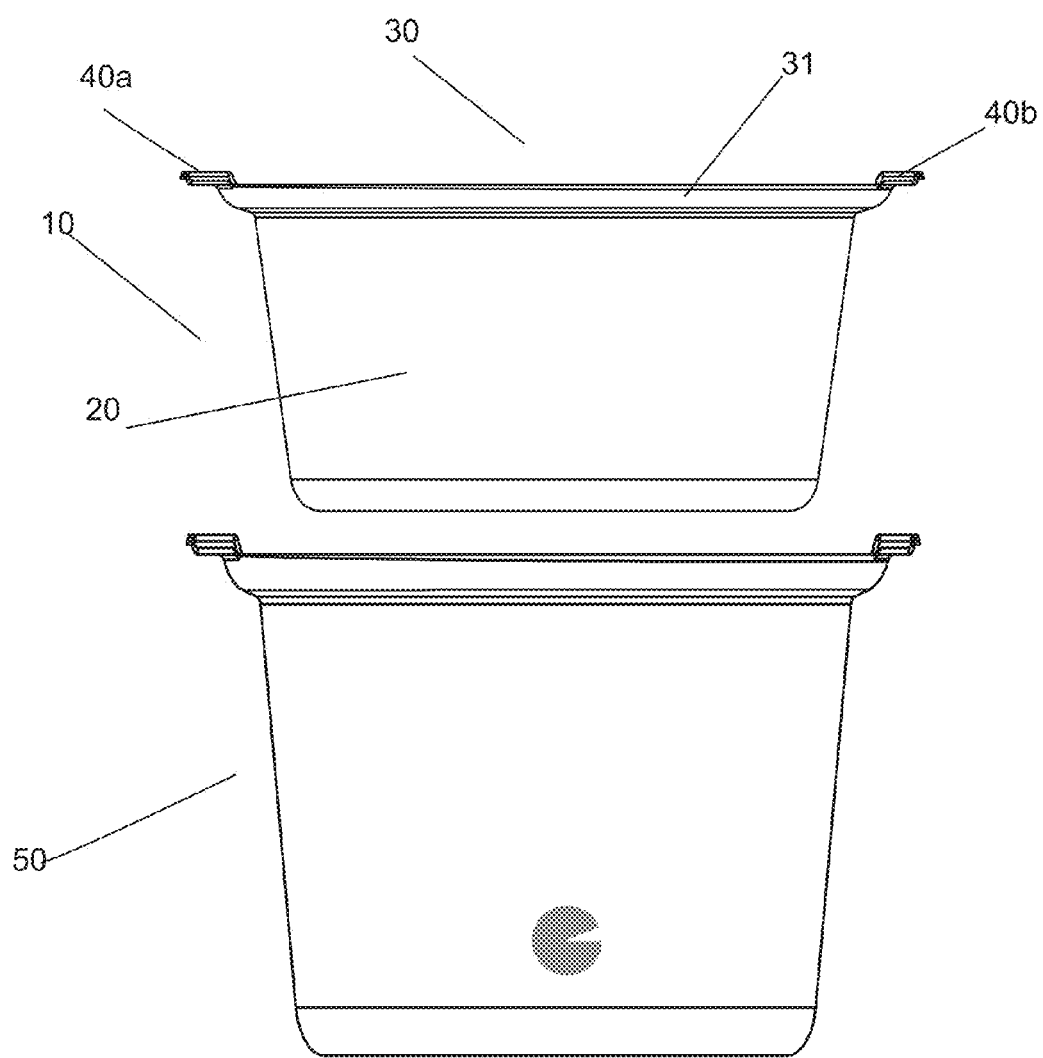
FIG. 1 is a front view of the cooking accessory as it will be inserted into a slow cooker in accordance with the present invention.

The present invention is directed to a slow cooker accessory comprising a receptacle having a walled body, an open end, and handles; and a plurality of openings within the walled body. The walled body is comprised of a continuous side and a bottom forming an inner surface and an outer surface, wherein the receptacle is insertable into and removable from an interior of a slow cooker vessel such that the outer surface of the walled body is received by the interior of the slow cooker vessel. The plurality of openings within the walled body permits passage of liquid, air, and steam and prevents the passage of solid food from the receptacle into the slow cooker vessel and are preferably located within the bottom of said walled body. The open end of the receptacle has a rim having an outer rim lip and an inner rim lip. The outer rim lip adjoins the rim of slow cooker vessel while the handles of the receptacle adjoin the handles of the slow cooker vessel thus supporting the receptacle within the vessel.

The slow cooker accessory preferably has at least one removable plate having a body with a plurality of plate openings. The plate is used to divide the receptacle into at least two sections which enables users to divide solid foods during the cooking process in desired configurations and also allows for submerging a portion or all of the solid foods in a cooking liquid as desired. The plate has at least one handle extending from a first side of the body in the direction of the open end of said receptacle for easy insertion and removal of the plate into the slow cooker vessel. The plate can have a plurality of legs extending from a second side of the body to support the plate within the receptacle. Alternatively, a plurality of supports extending from the inner surface of the walled body of the receptacle can support the plate within said receptacle. The openings within the body of the receptacle and within the body of the plate openings have a width within the range of about 1.0 mm to about 8.0 mm, with the preferable width being about 3.0 mm to about 3.5 mm. The plurality of openings within the receptacle and plate are preferably oblong having a variety of lengths in the range of about 6.0 mm to about 100 mm. It is preferred that the receptacle is made of silicone. In another embodiment, the continuous side wall of slow cooker accessory has a telescoping configuration comprising at least two wall panels.

The present invention provides a method of separating cooking substances within a slow cooker vessel using a slow cooker accessory comprising a receptacle having a walled body with a plurality of openings, an open end with a rim, and handles comprising the steps of inserting the receptacle of the slow cooker accessory into said slow cooker vessel of compatible size and shape; securing the receptacle in position by engaging the handles of the receptacle with handles of the slow cooker vessel; placing at least one cooking solid into the receptacle within the slow cooker vessel; placing a slow cooker vessel lid onto the rim of the receptacle; cooking said at least one cooking solid for an allotted cooking time; and lifting the receptacle by said handles of the receptacle from said slow cooker vessel, said lifting allowing cooking liquid accumulated during the cooking time to drain through the openings of the receptacle and into the slow cooker vessel. If desired, the user can also insert a plate into the receptacle, thus allowing for at least one cooking solid placed on the plate to be separated from another at least one cooking solid within the receptacle. At least one cooking liquid can be added to the slow cooker vessel to any desired level thus allowing for partial or total submersion of the cooking solid or solids within the receptacle.

DETAILED DESCRIPTION OF THE INVENTION

The present invention provides a slow cooker accessory that is compatible with existing slow cooker vessels that enables users to separate food into desired configurations for the duration of the cooking time while also enabling users to easily remove food from cooking liquids, juices, and fats at any time during the cooking process. This cooking accessory and method of using a slow cooker is a significant advantage to cooks by allowing for easy separation of solids from undesired liquids; easy separation of solids from liquids to be used for other parts of a recipe or meal; and easy separation of solids from other solids for recipe purposes, serving purposes, and for appeasing picky eaters.

Figure 2:
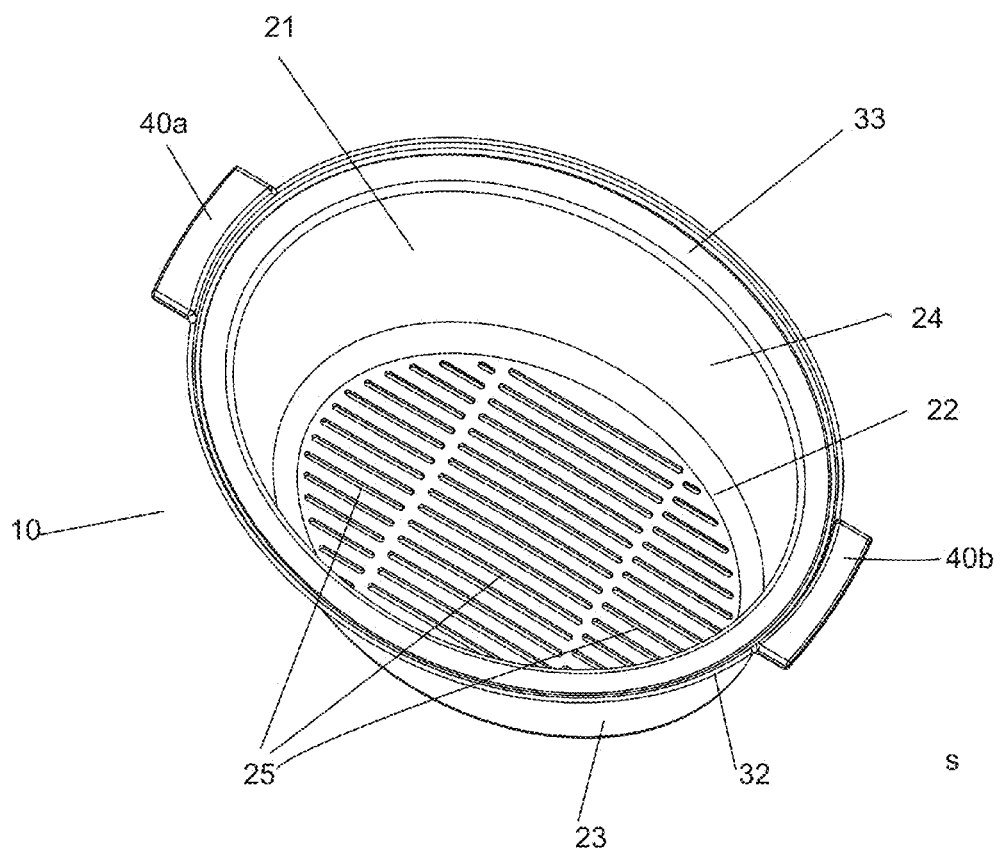
FIG. 2 is a perspective view of the cooking accessory in accordance with the present invention.

As shown in FIGS. 1 and 2, the slow cooker accessory of the present invention is a receptacle 10 having a walled body 20, an open end 30, and handles 40a and 40b (hereinafter collectively referred to as "handles 40"). Walled body 20 is comprised of a side wall 21 that extends downward from the periphery of open end 30 attaching continuously to bottom wall 22. Walled body 20 is configured to fit within a slow cooker vessel 50 such that outer surface 23 is proximal to the interior of vessel 50 and inner surface 24 is proximal to food placed within the receptacle 10. It is preferred that bottom wall 22 does not sit directly on the floor of slow cooker vessel 50 in order to deter suctioning of the receptacle 10 to the vessel 50 upon removal of the receptacle. The space between the bottom wall 22 and the floor of vessel 50 is preferably about 0.5 mm. While this is the preferred spacing in order to maximize the capacity of the receptacle 10 while minimizing suction, other spacing could be functional as determined by one skilled in the art.

Slow cooker vessel 50 can be any slow cooker vessel known in the art. Walled body 20 contains a plurality of openings 25 that allow for the passage of fluid such as, but not limited to, cooking liquid, broth, juices, and fat. Openings 25 can be any functional configuration including but not limited to circular holes and oblong slots. The width of each of the openings 25 is preferably within the range of about 1.0 mm to about 8.0 mm, with the most preferred width being about 3.0-3.5 mm. The openings 25 prevent food having a size larger than the width of the openings from passing from the receptacle 10 into the slow cooker 50. In the preferred embodiment, openings 25 are oblong openings having a width of about 3.0-3.5 mm and a length ranging from about 6.0 mm to about 100 mm. Walled body 20 can be comprised of a mesh material or a solid material configured with openings 25. Receptacle 10 can be made from any material or combination of materials which is known to be safe for prolonged food exposure and can withstand prolonged temperatures in the range of at least 200-400 degrees Fahrenheit including but not limited to stainless steel, silicone, and plastics such as polyurethane. The most preferred configuration of walled body 20 is a solid side wall 21 with no openings and a solid bottom wall 22 with oblong openings 25 wherein the body material is a food grade silicone. This configuration provides for optimal fit, structural integrity, and drainage. In order to maintain the structural integrity, optimal fit, and an optimal food supporting surface, the silicone comprising walled body 20 has a thickness of about 1.5-3.0 mm, with the thickness most preferably being about 2.5 mm.

As also shown in FIGS. 1 and 2, handles 40 extend from and are integral with receptacle 10. When receptacle 10 is placed within cooking vessel 50, handles 40 engage the handles of slow cooker vessel 50. Preferably handles 40 engage the slow cooker vessel handles by fitting over, and resting on, the slow cooker vessel handles. Handles 40 are preferably made of or coated in a material such as silicone to keep the handles firmly engaged with the vessel 50, to minimize scratching of vessel 50, and to minimize heating of the handles. Handles 40 allow the receptacle 10 to be easily removed from the cooking vessel or it allows the cooking vessel 50 to be lifted with the receptacle 10 still attached.

As shown in FIG. 1 and FIG. 2, the periphery of open end 30 creates a rim 31. Outer rim lip 32 of rim 31 engages the periphery of cooking vessel 50, thereby allowing receptacle 10 to fit securely against the cooking vessel. Inner rim lip 33 of rim 31 is configured to receive the lid of cooking vessel 50, thereby allowing the lid of existing slow cookers to fit securely to the receptacle 10. The dimensions of the rim 31 are configured to fit slow cookers known in the art and will vary depending on the size and shape of the slow cooker for which it will be used. Accordingly, a receptacle that is to be used with a particular sized round slow cooker would have a rim 31 that would fit the cooking vessel of any brand slow cooker of that same size and shape. The rim 31 is preferably continuous with the walled body 20 and therefore made of the same material as the body 20. It is further preferable that if a material other than silicone is used for body 20 that rim 31 be coated in a smooth material such as silicone to help keep the rim engaged with the vessel and to minimize scratching of the vessel.

Figure 5:
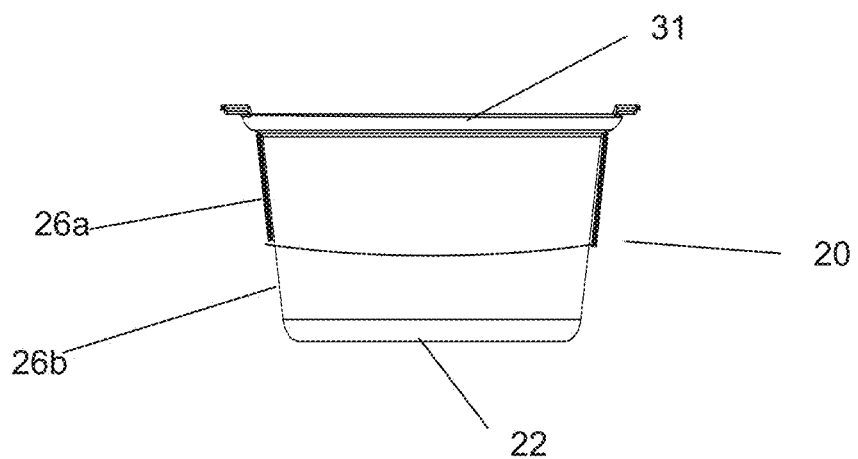
FIG. 5 is a front view of a preferred embodiment of the present invention showing an expandable wall.

Since the receptacle 10 is configured to work with existing slow cooker devices, the size of the receptacle can vary depending upon the size of the slow cooker with which it is to be used. Slow cookers typically range in capacity from about 1.0 quarts to about 10 quarts, with a 6-8 quart capacity being the most popular models. The exact configuration of the receptacle 10 will be determined by the cooking vessel with which it is intended to be used. For example, a round 6 quart slow cooker would require a receptacle 10 that is about 12 inches in diameter. Generally, the walled body 20 should be approximately 2 mm less in diameter than the vessel with which it will be used in order to leave a space in the range of about 0-1.9 mm between the walled body and the wall of the vessel. While this is the preferred spacing in order to maximize the capacity of the receptacle 10 while minimizing suction, other spacing could be functional as determined by one skilled in the art. The preferred space should be just enough so as to prevent suctioning between the receptacle 10 and the vessel 50. In the preferred embodiment, by using silicone for the body wall 20, a single receptacle 10 can fit well within a slow cooker having a 6.5, 7, or 8 quart vessel 50. 19. Whatever the preferred diameter of a particular receptacle configuration, there are two preferred depths of the walled body 20 depending on the use of the receptacle. One preferred depth is a depth substantially the same as the depth of the vessel with which the receptacle is being used. This configuration is preferred when the receptacle is being used as a means for draining cooking fluid from the food at any time during the cooking process. For instance, to drain fat and juice from a pork roast at the end of the preferred cooking time. A second preferred depth of the walled body 20 is a depth approximately one-third to one-half the depth of the cooking vessel. This configuration is preferred when the receptacle is being used to separate foods during the cooking process. For instance, to keep vegetables and meat separated or to separate particular ingredients in a recipe for picky eaters. These preferred depths can be accomplished by simply making separate receptacles for these different uses with two different depth dimensions. Alternately, as shown in FIGS. 4A and 5, these varying depths can be accomplished within one receptacle by using a separating plate within the walled body or a by using a telescoping walled body. Other configurations for accomplishing varying depths of the receptacle are also possible.

Figure 3A:
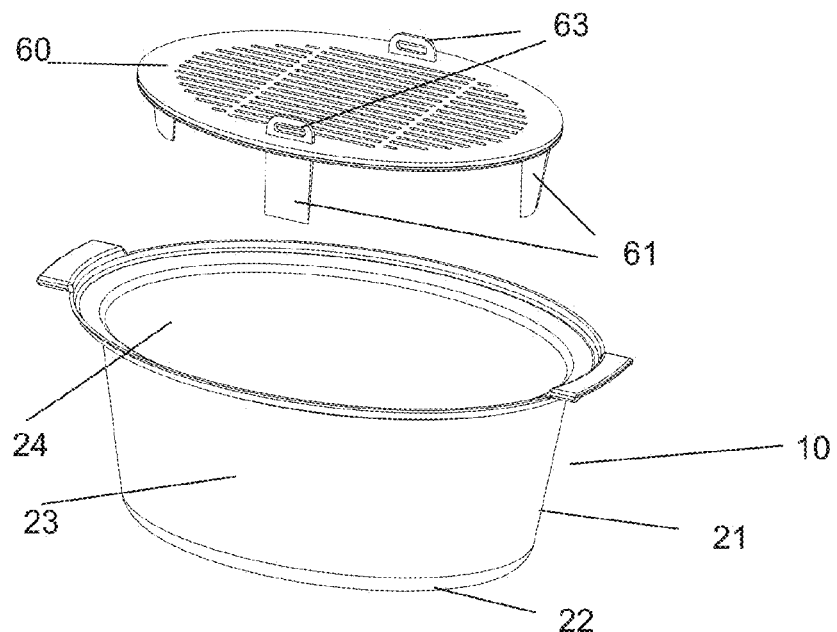
FIG. 3A is a perspective view of an embodiment of the present invention showing a legged plate before insertion into the cooking accessory.
Figure 3B:
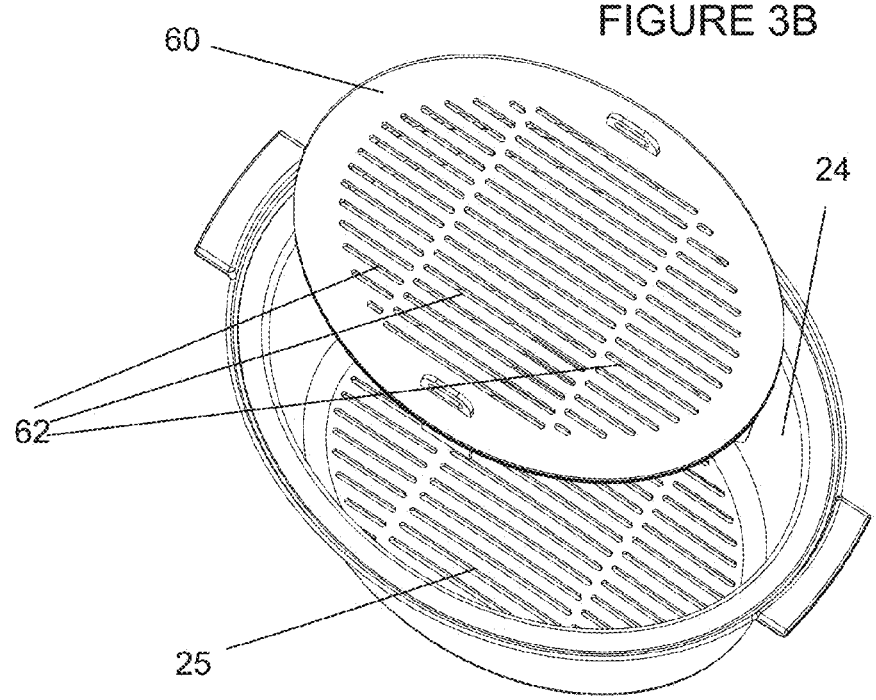
FIG. 3B is a top view of the legged plate embodiment of 3A

FIG. 3A shows a preferred embodiment wherein receptacle 10 includes an open end 30 and a walled body 20 having a side wall 21 extending to bottom wall 22 as in the embodiment of FIGS. 1 and 2. The preferred embodiment of FIG. 3A further includes a plate 60 that fits within walled body 20 of receptacle 10. Plate 60 has a plurality of plate legs 61 that support plate 60 above wall bottom 22 when the plate in inserted into the receptacle. Preferably plate 60 has four plate legs 61 though any functional number of legs could be used. Plate legs 61 are preferably about 2.5 inches in length though other lengths are possible depending on the desired height of the plate 60 within the receptacle. Plate 60 also has a plurality of plate openings 62 through which liquids, air, and steam can pass while preventing the passage of food. Plate openings 62 preferably have the same configuration as the openings within walled body 20 as discussed above, although other configurations can be used. Further, plate 60 includes a plurality of plate handles 63 for easy insertion and removal of plate 60 within receptacle 10. The dimensions of plate 60 are such that the plate can easily slide into and out of walled body 20 while at the same time not allowing food to fall from the plate into the bottom of the receptacle. Multiple plates 60 could be stacked within receptacle 10 if desired. It is preferred that plate 60 is comprised of the same material as receptacle 10. As noted above, the most preferred material is a food grade silicone material. In order for a silicone plate 60 to maintain structural integrity under the weight of food, the plate has a preferred thickness in the range of about 2.5 mm to about 6.5 mm While a plate 60 having legs 61 is preferred, a legless plate 60 is also a possible embodiment as shown in FIG. 4 wherein the walled body 20 includes a plurality of plate supports 64 around the in inner surface 24 of side wall 21 at a depth of about one-third to about one-half the depth of the receptacle. These supports 64 enable the walled body 20 to receive at least one plate 60 to divide the receptacle into at least two sections. FIG. 5 shows another embodiment wherein walled body 20 is adjustable so that receptacle 10 can be positioned in at least two different depths. In this embodiment walled body 20 has a telescoping configuration comprising at least two wall panels 26a and 26b. Wall panel 26a extends downward from rim 31 of open end 30 approximately one-third to one-half the depth of the cooking vessel. Wall panel 26b is configured to fit snugly within wall panel 26a and extends downward to fit with another wall panel or to continue to bottom wall 22 depending on the number of wall panels used in the configuration. Wall panel 26b can slide downward from a first position within wall panel 26a into a second position under and frictionally attached to wall panel 26a. In the second position, bottom wall 22 of wall panel 26b is proximal to the bottom surface of slow cooker vessel 50 so that receptacle 10 spans substantially the entire depth of the slow cooker vessel. At least bottom wall 22 has a plurality of openings 25 to permit the passage of cooking fluids but to prevent the passage of food.

All of the embodiments set forth above include a receptacle configured to fit within an existing slow cooker vessel. The exact dimensions of the receptacle will vary depending on the dimensions of the slow cooker with which the receptacle will be used. The receptacle of each embodiment has handles that engage the handles of the slow cooker vessel to secure the receptacle to the slow cooker. Further the receptacle of each embodiment has a rim 31 for engaging the upper periphery of the slow cooker vessel to so that the receptacle rests on the slow cooker and is supported within the slow cooker vessel.

Each embodiment of the present invention can include a configuration for suspending food via the receptacle within the cooking vessel at a depth of about one-third to one-half of the depth of the slow cooker vessel for which the receptacle is intended. At this depth, it is a significant advantage of the present invention that the receptacle provides a method to separate food within the slow cooker vessel by dividing food in any desired combination between at least the top and bottom halves of the cooking vessel. This configuration allows food to be kept separated during the cooking process while cooking the food within the same vessel for the same duration using the same cooking fluid. The openings within the walls of the receptacle allow cooking fluid to pass freely throughout the cooking vessel. The cooking fluid can cover only the food on the bottom of the cooking vessel or fill the entire vessel as desired. This configuration makes food presentation and cooking for particular eaters an easier task.

Each embodiment of the present invention can also include a configuration for suspending food via the receptacle within the cooking vessel at a depth that is substantially the same as the depth of the slow cooker vessel for which the receptacle is intended. At this depth, it is a significant advantage of the present invention that the receptacle provides a method to easily remove food from the cooking fluids within the cooking vessel. The openings within the walled body of the receptacle allow fluid to pass freely within the cooking vessel and also allow cooking fluid to drain away from the food when the receptacle is lifted from the cooking vessel.

The present invention provides a method for separating cooking solids such as but not limited to meats and vegetables from one another and separating cooking solids from cooking liquids such as but not limited to fat, broth, water, and juice within the cooking vessel of a slow cooker. This separation is accomplished by inserting the receptacle of the slow cooker accessory of the present invention into a slow cooker vessel of compatible size and shape; securing the receptacle in position by resting the handles of the receptacle over the handles of the existing slow cooker vessel; placing at least a cooking solid into the receptacle-engaged cooking vessel; placing the slow cooker vessel lid onto the rim of the receptacle; cooking the cooking solid for the allotted cooking time; and lifting the receptacle by the handles from said slow cooker vessel thus allowing any cooking liquid used in or rendered from the cooking process to drain through the openings of the receptacle and into the slow cooker vessel. Additionally, at least one cooking solid can be separated from another at least one cooking solid or cooking liquid by inserting the plate of the slow cooker accessory of the present invention into the receptacle, said plate can be inserted over at least one cooking solid or inserted into an empty receptacle; and placing at least one cooking solid on the plate. At least one cooking liquid can be added to a desired cooking level within the slow cooker vessel. For example, the cooking liquid can be added to a level to remain under the cooking plate or to a level to partially or fully submerge all cooking solids in the slow cooker vessel. Another plate can be inserted over the first inserted plate as allowed by the configuration of the plate and depth of the slow cooker vessel. This method of separating cooking solids and cooking liquids in a slow cooker is a great advantage as it allows for easy separation of solids from undesired liquids; easy separation of solids from liquids to be used for other parts of a recipe or meal; and easy separation of solids from other solids for recipe purposes, serving purposes, and for appeasing picky eaters.

Other variations and modifications of the present invention will be apparent to those of ordinary skill in the art, and it is intended that such variations and modifications be covered by this disclosure. Particular values and configurations discussed above can be varied, are cited to illustrate representative embodiments of the present invention and are not intended to limit the scope of the invention.

LIST OF COMPONENTS

| Number | |
|---|---|
| 10 | receptacle |
| 20 | walled body |
| 21 | side wall |
| 22 | bottom wall |
| 23 | outer surface |
| 24 | inner surface |
| 25 | openings |
| 26a | wall panel |
| 26b | wall panel |
| 30 | open end |
| 31 | rim |
| 32 | outer rim lip |
| 33 | inner rim lip |
| 40a, b | handles |
| 50 | slow cooker vessel |
| 60 | plate |
| 61 | plate legs |
| 62 | plate openings |
| 63 | plate handles |
| 64 | plate supports |

The invention claimed is:

1. A slow cooker accessory comprising:
a receptacle removably engaging an interior of a slow cooker vessel, said slow cooker vessel having a depth, an upper periphery, and handles, and said receptacle having a walled body, an open end, and handles; and
a plurality of openings within said walled body;
wherein, said open end is comprised of a rim extending from said walled body, said rim having a size and a shape compatible with said upper periphery of said slow cooker vessel, said rim having an outer rim lip and an inner rim lip, said outer rim lip configured to couple to said upper periphery of said slow cooker vessel, and said inner rim lip configured to receive a lid of said slow cooker vessel;
wherein, said walled body is comprised of a continuous side and a bottom forming an inner surface and an outer surface, said continuous side having a depth extending from the rim of said open end to the bottom of said walled body;
wherein said receptacle is configured such that said depth of the continuous side is entirely received by the interior of said slow cooker vessel;
wherein said receptacle handles extend from said rim of said open end, said receptacle handles configured to adjoin the handles of said slow cooker vessel;
and wherein said plurality of openings within said walled body are configured for passage of liquid, air, and steam and retention of solid food.

2. The slow cooker accessory of claim 1 further comprising at least one removable plate, said plate having a body and dividing said depth of said continuous side of said receptacle into at least two sections.

3. The slow cooker accessory of claim 2 further comprising a plurality of plate openings within said body of said plate.

4. The slow cooker accessory of claim 2 further comprising at least one handle extending from a first side of said body of said at least one plate in the direction of said open end of said receptacle.

5. The slow cooker accessory of claim 2 further comprising a plurality of legs extending from a second side of said body of said at least one plate to support said plate within said receptacle.

6. The slow cooker accessory of claim 2 further comprising a plurality of supports extending from said inner surface of said walled body to support said plate within said receptacle.

7. The slow cooker accessory of claim 1 wherein said plurality of openings is within said bottom of said walled body.

8. The slow cooker accessory of claim 1 wherein said plurality of openings has a width within the range of about 1.0 mm to about 8.0 mm.

9. The slow cooker accessory of claim 8 wherein said plurality of openings have a width of about 3.0 mm to about 3.5 mm.

10. The slow cooker accessory of claim 1 wherein said plurality of openings are oblong having a variety of lengths in the range of about 6.0 mm to about 100 mm.

11. The slow cooker accessory of claim 1 wherein said receptacle is made of silicone, said silicone having a thickness in the range of about 2.5 mm to about 6.5 mm.

12. The slow cooker accessory of claim 1 wherein said depth of the continuous side is at least one-third said depth of the slow cooker vessel.

13. The slow cooker accessory of claim 12 wherein said depth of said continuous side is substantially equal to the depth of said slow cooker vessel.

14. The slow cooker accessory of claim 1 wherein said continuous side has an adjustable telescoping configuration comprising at least a first continuous side panel and a second continuous side panel.

15. The slow cooker accessory of claim 14 wherein said second continuous side panel is movably attached to said first continuous side panel such that second continuous side panel slides within said first continuous side panel to adjust the depth of said continuous side of said walled body.

* * * * *